(12) United States Patent
Burtch

(10) Patent No.: US 12,703,351 B2
(45) Date of Patent: Aug. 11, 2026

(54) AUTOMATED DRIVING OBSTACLE AVOIDANCE ALONG A PATH

(71) Applicant: Joseph Burtch, Lake Orion, MI (US)

(72) Inventor: Joseph Burtch, Lake Orion, MI (US)

(73) Assignee: AUMOVIO Autonomous Mobility US, LLC, Auburn Hills, MI (US)

( * ) Notice: Subject to any disclaimer, the term of this patent is extended or adjusted under 35 U.S.C. 154(b) by 854 days.

(21) Appl. No.: 17/645,635

(22) Filed: Dec. 22, 2021

(65) Prior Publication Data

US 2023/0192075 A1 Jun. 22, 2023

(51) Int. Cl.
*B60W 30/09* (2012.01)

(52) U.S. Cl.
CPC ....... *B60W 30/09* (2013.01); *B60W 2530/201* (2020.02); *B60W 2554/801* (2020.02); *B60W 2554/802* (2020.02); *B60W 2720/24* (2013.01)

(58) Field of Classification Search
CPC ........... B60W 30/09; B60W 2530/201; B60W 2554/801; B60W 2554/802; B60W 2720/24; B60W 2554/20; B60W 2552/50
USPC ........................................................... 701/26
See application file for complete search history.

(56) References Cited

U.S. PATENT DOCUMENTS 7,684,894 B2 3/2010 Sakai et al.
8,467,953 B2 * 6/2013 Naderhirn .............. G08G 5/045 701/301
2015/0210274 A1 7/2015 Clarke et al.
2016/0132058 A1 * 5/2016 Lee ........................ G01S 13/931 701/26
2018/0056997 A1 3/2018 Ohmura et al.
2018/0281785 A1 10/2018 Berntorp et al.
2019/0291726 A1 * 9/2019 Shalev-Shwartz ...... G01S 13/60
2020/0225681 A1 * 7/2020 Stein ..................... B60W 30/09
2021/0163068 A1 * 6/2021 Zhu ........................ G05D 1/021
2021/0237769 A1 * 8/2021 Ostafew .......... B60W 30/18159

FOREIGN PATENT DOCUMENTS

CN 105549597 A 5/2016
CN 105955304 A 9/2016
EP 3647735 A1 * 5/2020 ........ B60W 30/0956

(Continued)

OTHER PUBLICATIONS

J. Ziegler, P. Bender, T. Dang and C. Stiller, "Trajectory planning for Bertha—A local, continuous method," 2014 IEEE Intelligent Vehicles Symposium Proceedings, Dearborn, MI, USA, 2014, pp. 450-457, doi: 10.1109/IVS.2014.6856581. (Year: 2014).*

(Continued)

*Primary Examiner* — Abby J Flynn
*Assistant Examiner* — Leah N Miller

(57) ABSTRACT

A method of autonomously defining a vehicle path according to a disclosed exemplary embodiment includes, among other possible things, detecting an object that is disposed within a predetermined path with a sensor system within a vehicle, defining an avoidance clearance around the detected object with a vehicle control system within the vehicle, defining a look-ahead clearance centered on a portion of the vehicle with the vehicle control system, detecting intersections between the avoidance clearance and the look-ahead clearance with the vehicle control system, and changing the vehicle path based on the intersections between the avoidance clearance and the look-ahead clearance.

16 Claims, 4 Drawing Sheets

(56) References Cited

FOREIGN PATENT DOCUMENTS

| | | | | | |
|---|---|---|---|---|---|
| JP | 4576445 | B2 | * | 11/2010 | ........... G05D 1/0214 |
| JP | 2010282442 | A | | 12/2010 | |
| JP | 2011197780 | A | | 10/2011 | |
| JP | 2011253302 | A | | 12/2011 | |
| JP | 2017052414 | A | | 3/2017 | |
| JP | 2017084115 | A | | 5/2017 | |
| JP | 2019032607 | A | | 2/2019 | |
| JP | 2020095635 | A | | 6/2020 | |
| JP | 2022134905 | A | * | 9/2022 | ............ B60W 30/09 |
| WO | 2018172849 | A1 | | 9/2018 | |

OTHER PUBLICATIONS https://www.edmunds.com/mercedes-benz/s-class/2012/review/. Accessed: Mar. 21, 2024 (Year: 2024).* https://www.edmunds.com/mercedes-benz/s-class/2013/review/. Accessed: Mar. 21, 2024 (Year: 2024).*

International Search Report dated Apr. 14, 2023 of International Application PCT/US2022/082194 claiming priority to this application.

Notice of Reasons for Refusal mailed on Jul. 30, 2025 for the counterpart Japanese Patent Application No. 2024 537996 and machine translation of same.

* cited by examiner

AUTOMATED DRIVING OBSTACLE AVOIDANCE ALONG A PATH

TECHNICAL FIELD

The present disclosure relates to an autonomous vehicle control method and system for rerouting a vehicle around obstacles along a reference path.

BACKGROUND

Automated driving and driver assist systems gather information about an environment surrounding a vehicle and use that information to plan and move along a desired path. Movement along the desired path requires detection of any objects present in the environment surrounding the vehicle and along the path. If an object is detected along the path, the autonomous systems may modify the path to move around or past the object. However, any modification may require additional information and that may accumulate large amounts of information and data that can be challenging to process. Automotive manufactures are continuously seeking more efficient information processing methods to improve operation of vehicle systems.

The background description provided herein is for the purpose of generally presenting a context of this disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A method of autonomously defining a vehicle path according to a disclosed exemplary embodiment includes, among other possible things, detecting an object that is disposed within a predetermined path with a sensor system within a vehicle, defining an avoidance clearance around the detected object with a vehicle control system within the vehicle, defining a look-ahead clearance centered on a portion of the vehicle with the vehicle control system, detecting intersections between the avoidance clearance and the look-ahead clearance with the vehicle control system, and changing the vehicle path based on the intersections between the avoidance clearance and the look-ahead clearance.

In another exemplary embodiment of the foregoing method, the avoidance clearance around the detected object comprises a circular area centered on the object.

In another exemplary embodiment of any of the foregoing methods, the circular area of the avoidance clearance comprises a radius equal to at least half a width of the vehicle.

In another exemplary embodiment of any of the foregoing methods, the look-ahead clearance comprises a circular area and the vehicle portion comprises a midpoint of an axle of the vehicle controlling a heading of the vehicle.

In another exemplary embodiment of any of the foregoing methods, the circular area of the look-ahead clearance comprises a radius equal to or greater than at least half a width of the vehicle.

In another exemplary embodiment of any of the foregoing methods, changing the vehicle path further comprises realigning the predetermined path with the intersections between the avoidance clearance and the look-ahead clearance.

In another exemplary embodiment of any of the foregoing methods, the intersections between the avoidance clearance and the look-ahead clearance comprises two intersections.

Another exemplary embodiment of any of the foregoing methods further comprises selecting one of the two intersections for realigning the predetermined path.

In another exemplary embodiment of any of the foregoing methods, selecting one of the two intersections comprises comparing a distance between each of the two intersections and a constraint that limits movement of the vehicle and selecting the intersection that is the greater distance from the constraint.

In another exemplary embodiment of any of the foregoing methods, the constraint comprises a predefined boundary that separates different driving surfaces.

In another exemplary embodiment of any of the foregoing methods, the constraint comprises a predefined boundary, the predefined boundary comprising an object extending upwardly from a driving surface.

An autonomous vehicle control system according to another exemplary embodiment includes, among other possible things, a controller mountable within a vehicle that is configured to detect an object that is disposed within a predetermined path with a sensor system within a vehicle, define an avoidance clearance around the detected object with a vehicle control system within the vehicle, define a look-ahead clearance centered on a portion of the vehicle with the vehicle control system, detect intersections between the avoidance clearance and the look-ahead clearance with the vehicle control system, and change the vehicle path based on the detected intersections between the avoidance clearance and the look-ahead clearance.

In another embodiment of the foregoing autonomous vehicle control system, the avoidance clearance around the detected object comprises a circular area centered on the object with a radius equal to at least half a width of the vehicle.

In another embodiment of any of the foregoing autonomous vehicle control system, the look-ahead clearance comprises a circular area and the vehicle portion comprises a midpoint of an axle of the vehicle controlling a heading of the vehicle.

In another embodiment of any of the foregoing autonomous vehicle control system, the controller is further configured to realign the predetermined path based on a location of the intersections between the avoidance clearance and the look-ahead clearance.

In another embodiment of any of the foregoing autonomous vehicle control system, intersections between the avoidance clearance and the look-ahead clearance comprises two intersections and the controller is further configured to select one of the two intersections for realigning the predetermined path.

In another embodiment of any of the foregoing autonomous vehicle control system, the controller is configured to compare a distance between each of the two intersections and a constraint that limits movement of the vehicle and to select the intersection that is the greater distance from the constraint.

In another embodiment of any of the foregoing autonomous vehicle control system, the controller is configured to recognize the constraint as one of a predefined boundary that separates different driving surfaces and an object extending upwardly from a driving surface.

A non-transitory computer readable storage medium including instructions for operating an autonomous vehicle control system, the computer readable storage medium according to another exemplary embodiment includes, among other possible things, instructions to prompt a controller to detect an object that is disposed within a predetermined path with a sensor system within a vehicle, instructions to prompt a controller to define an avoidance clearance around the detected object with a vehicle control system within the vehicle, instructions to prompt a controller to define a look-ahead clearance centered on a portion of the vehicle with the vehicle control system, instructions to prompt a controller to detect intersections between the avoidance clearance and the look-ahead clearance with the vehicle control system, and instructions to prompt a controller to change the vehicle path based on the detected intersections between the avoidance clearance and the look-ahead clearance.

Another embodiment of the foregoing non-transitory computer readable storage medium further includes instructions for prompting the controller to compare a distance between each of the intersections and a constraint that limits movement of the vehicle and to select the intersection with the greater distance from the constraint.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
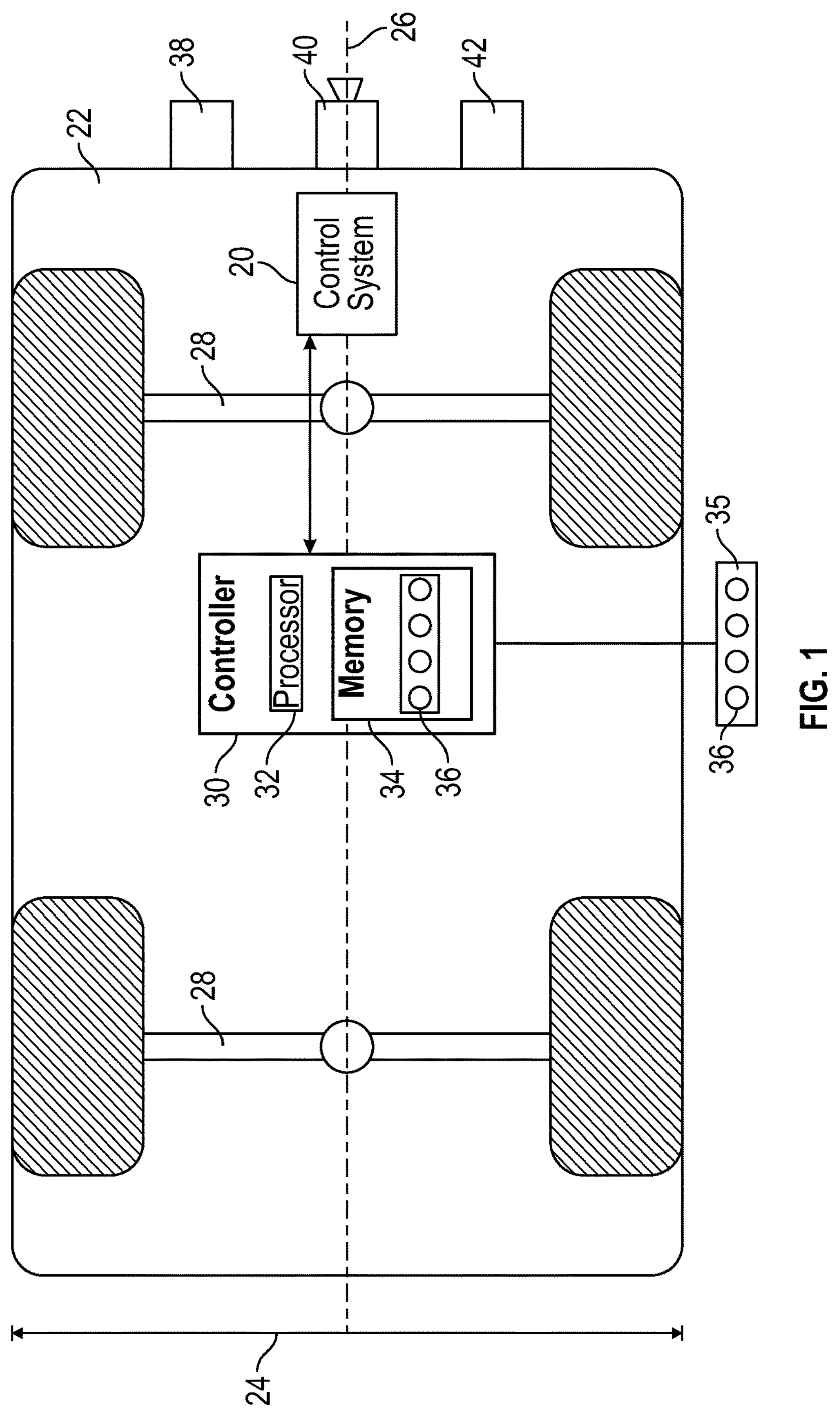
FIG. 1 is a schematic view of an example vehicle including an autonomous vehicle control system.

Referring to FIG. 1, a vehicle 22 is schematically shown and includes a driver assist control system 20. The driver assist control system 20 utilizes information from a plurality of sensors to detect objects within a reference path and make any modifications to the path required in view of the detected obstacle. The vehicle 22 is disposed along a centerline 26 and is of a width 24. In this disclosed example, the control system 20 obtains information from at least one of a radar sensor system 38, a camera system 40 and/or a lidar system 42. It should be appreciated that although several sensor systems are disclosed by way of example that other sensor systems could be utilized within the scope and contemplation of this disclosure.

The control system 20 receives information from a vehicle controller 30. The example vehicle control 30 includes a processor 32 and a memory device 34. A plurality of instructions 36 are stored within the memory device 34 that instruct the controller to operate the control systems to move a vehicle along a desired reference path.

The example controller 30 may be a separate controller dedicated to the control system 20 are may be part of an overall vehicle controller. Accordingly, the example controller 30 relates to a device and system for performing necessary computing or calculation operations of the control system 20. The controller 30 may be specially constructed tor operation of the control system 20, or it may comprise at least a general-purpose computer selectively activated or reconfigured by software instructions 36 stored in the memory device 34. The computing system can also consist of a network of (different) processors.

The example vehicle controller 30 includes the processor 32 and the memory device 34. The memory device 34 provides for the storage of the software instructions 36 that prompt operation of the controller 30 and control system 20. The software instructions 36 may be embodied in a computer program that uses data obtained from the sensor systems 38, 40 and 42 and data stored in the memory device 34 that may be required for its execution.

The instructions 36 for configuring and operating the controller 30, control system 20 and the processor 32 are embodied in software instructions that may be stored on a computer readable medium, schematically shown at 35. The computer readable medium 35 may be embodied in structures such as, but is not limited to, any type of disk including floppy disks, optical disks, CD-ROMs, magnetic-optical disks, read-only memories (ROMs), random access memories (RAMS), EPROMs, EEPROMs, magnetic or optical cards, application specific integrated circuits (ASICs), or any type of media suitable for storing electronic instructions, and each coupled to a computer system bus. The disclosed computer readable medium may be a non-transitory medium such as those examples provided.

Moreover, the software instructions 36 may be saved in the memory device 34. The disclosed memory device 34, may can include any one or combination of volatile memory elements (e.g., random access memory (RAM, such as DRAM, SRAM, SDRAM, VRAM, etc.) and/or nonvolatile memory elements (e.g., ROM, hard drive, tape, CD-ROM, etc.). The software instructions 36 in the memory device 34 may include one or more separate programs, each of which includes an ordered listing of executable instructions for implementing logical functions. The disclosed controller 30 is configured to execute the software instructions 30 stored within the memory device 34, to communicate data to and from the memory device 34, and to generally control operations pursuant to the software. Software in memory, in whole or in part, is read by the processor 32, perhaps buffered within the processor, and then executed.

Figure 2:
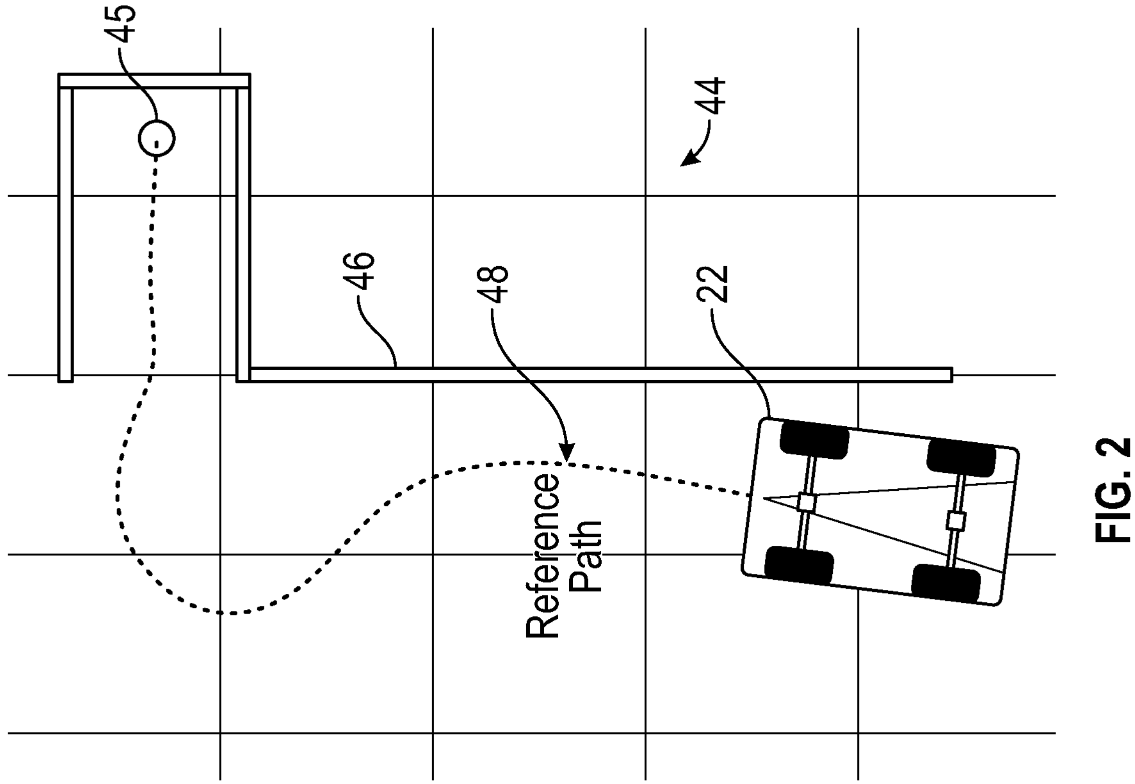
FIG. 2 is a schematic view of a map defined by the autonomous vehicle control system.

Referring to FIG. 2 with continued reference to FIG. 1, a map 44 is defined by the control system 20 with information obtained from sensor systems 38, 40, 42 to provide for the definition of a reference path 48. The map 44 may be created according to instructions 36 stored within the memory device 34. In this disclosed example, the map 44 defines a boundary 46 and the reference path 48 for the vehicle to proceed to a target destination 45. The boundary 46 may be a boundary indicating the end of a driving surface. In any of those instances, the map 44 is utilized by the vehicle control system 20 to operate the vehicle 22 along the reference path 48.

Figure 3:
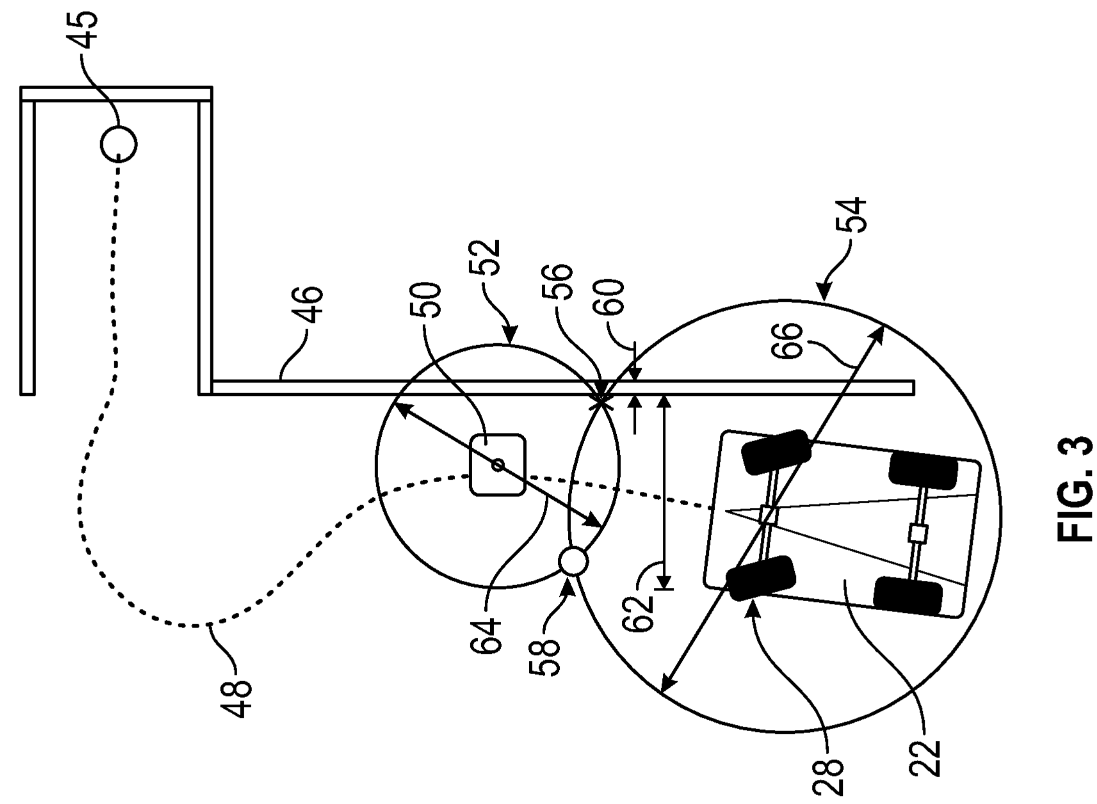
FIG. 3 is a schematic view of the vehicle disposed along a reference path relative to an obstacle.

Referring to FIG. 3 with continued reference to FIG. 1, in some instances an obstacle 50 will be detected along the reference path 48. In such instances, the vehicle control system 20 will utilize information from the sensor systems 38, 40, 42 to modify the reference path 48 to proceed around the obstacle 50.

The control system 20 modifies the reference path 48 by first defining an avoidance circle 52 around the obstacle 50. The avoidance circle 52 includes a diameter 64. The diameter 64 provides sufficient clearance around the obstacle 50 that the vehicle 22 may proceed without colliding into the obstacle. In one example, the diameter 64 is at least equal to the width 24 of the vehicle. The vehicle control system 20 will also define a look-ahead circle 54.

The look-ahead clearance circle 54 is centered on an axle 28 that provides for steering of the vehicle 22. The look-ahead circle 54 includes a diameter 66 that also provides sufficient clearance for the vehicle 22 to proceed around the obstacle 50. In one disclosed embodiment, the diameter 66 is at least equal to the width 24 of the vehicle 22. The axle 28 is the axle that provides for steering of the vehicle 22. In this disclosed example, the axle is the front axle 28 and the steering wheels front wheels rotate relative to a centerline 26 of the vehicle 22 to maneuver the vehicle along the reference path 48 or along a difference reference path to proceed around the obstacle 50.

The avoidance circle 52 and the look-ahead circle 54 are utilized to determine intersection points 58, 56. The intersection points 58, 56 are indicative of potential interferences between the vehicle 22 and the obstacle 50. The intersection points 56, 58 also are utilized to determine which direction around the obstacle 50 the vehicle 22 should proceed.

In one disclosed embodiment, the control system 20 determines a distance between each intersection point 56, 58 and other obstacles or objects that constrain where the vehicle may drive, such as the boundary 46. In this example, the intersection point 56 is disposed at a distance 60 from the boundary 46. The intersection point 58 is disposed at a distance 62 from the boundary 46. The distance 62 is greater than the distance 60 and therefore provides more clearance between a potential reference modified path and the boundary 46. As appreciated from FIG. 3, the first intersection point 56 would result in the vehicle proceeding across the boundary 46 and therefore is not a suitable direction for modification of the reference path 48. In contrast, the intersection point 58 is at a greater distance from the boundary 46 and would enable the vehicle to proceed around the obstacle 50.

Accordingly, in one example operation of the vehicle control system 20, the vehicle 2 is steered off of the reference path and toward the intersection point 58. The control system 20 continuously determined the distances 60 and 62 as the position of the vehicle 22 relative to the obstacle 50 changes.

Figure 4:
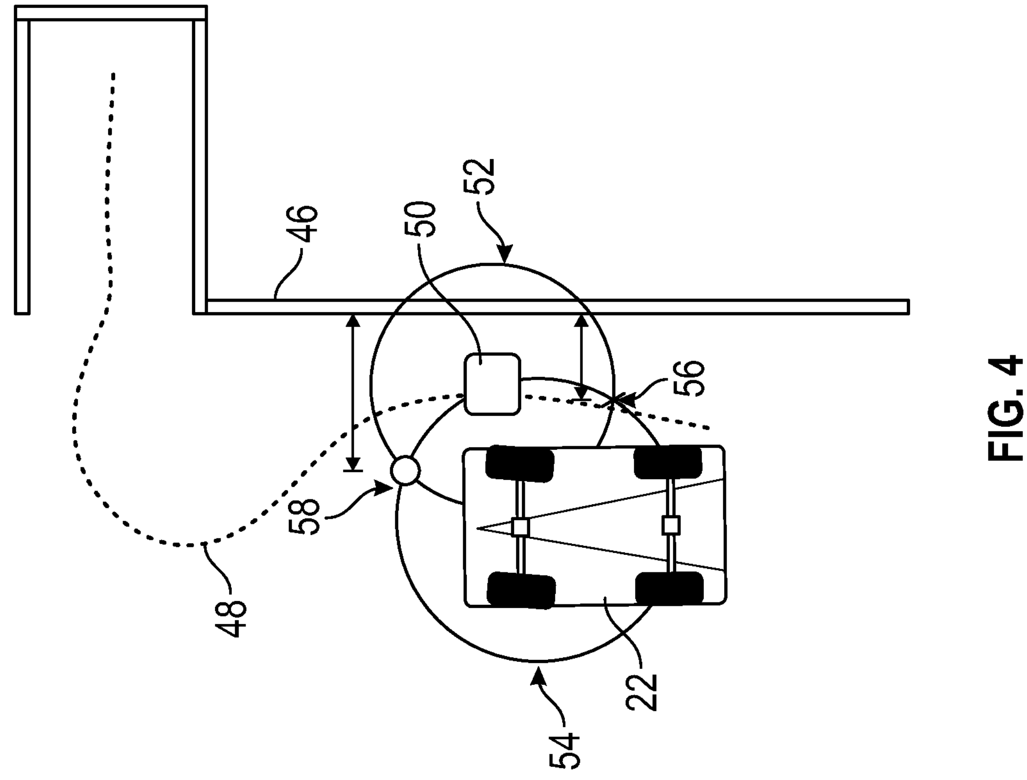
FIG. 4 is another schematic view of the vehicle and an avoidance clearance circle and a look-ahead circle intersection points relative to an obstacle.

Referring to FIG. 4 with continued reference to FIG. 3, as the vehicle 22 moves around the obstacle 50, the intersection points 56, 58 change due to the relative positions between the obstacle 50 and vehicle 22. As appreciated, as the relative position between the vehicle 22 and obstacle 50 changes so will the relative position between the avoidance circle 52 and the look-ahead circle 54. The avoidance circle 52 and look-ahead circle 54 maintain the same diameter but result in the intersections 56, 58 also moving relative to each of the vehicle 22 and obstacle 50.

As is shown in FIG. 4, as the vehicle 22 proceeds around the obstacle 50, the control system 20 continues calculating the distance between each intersection point 56, 58 and any boundary 46 defined within the map 44. In this example, the intersection 58 remains a greater distance from the boundary 46 and the vehicle will follow that intersection point 58 as it proceeds around the obstacle 50. The vehicle control system 20 will operate the vehicle to proceed toward the intersection point 58 until the vehicle 22 may move back toward the original reference path 48.

Figure 5:
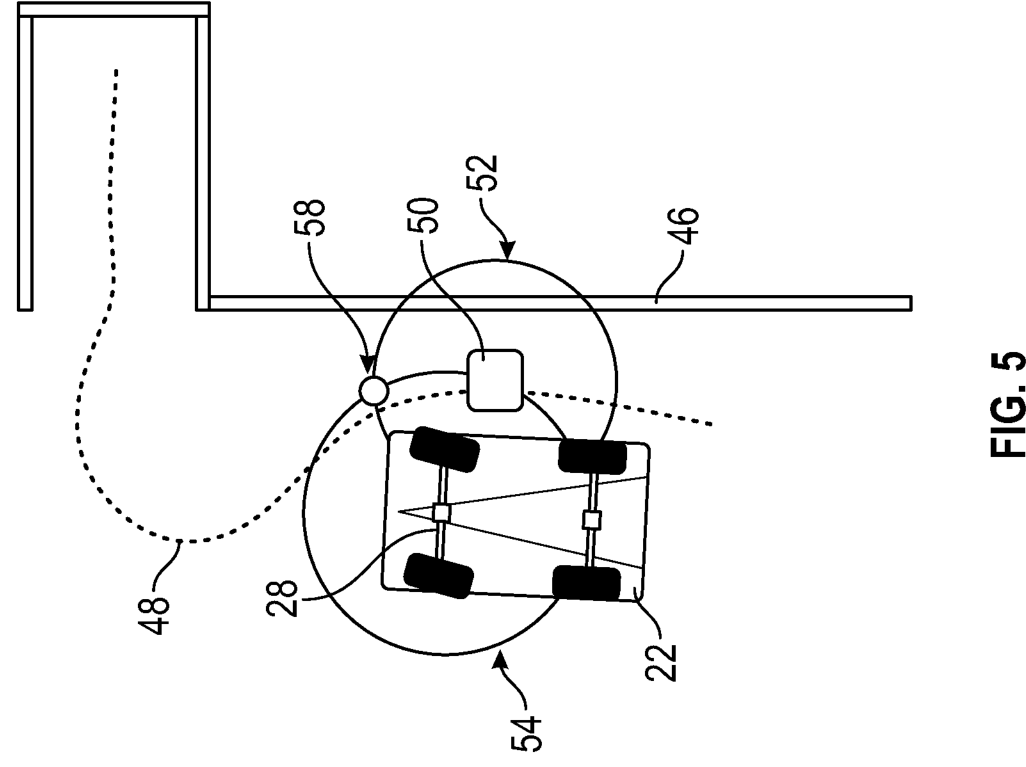
FIG. 5 is a schematic view of an example vehicle proceeding around an obstacle.

Referring to FIG. 5 with continued reference to FIGS. 3 and 4, the vehicle 22 proceeds in the direction towards the intersection 58 that is most distance from the boundary 46. In this example, the intersection 58 is at the greatest distance from the boundary 46 and a portion of the look-ahead circle 54 runs through the center of the obstacle 50. As the vehicle passes the obstacle 50, it will maintain a distance that is least as far as the diameter 66 of the look-ahead circle 54.

The vehicle 22 may return to the original path 48 once the path 48 is closer to the vehicle 22 than the intersection point 58. In this example, the vehicle 22 may proceed back to the reference path 48 as originally defined without contacting the obstacle 50 once past the obstacle 50.

Figure 6:
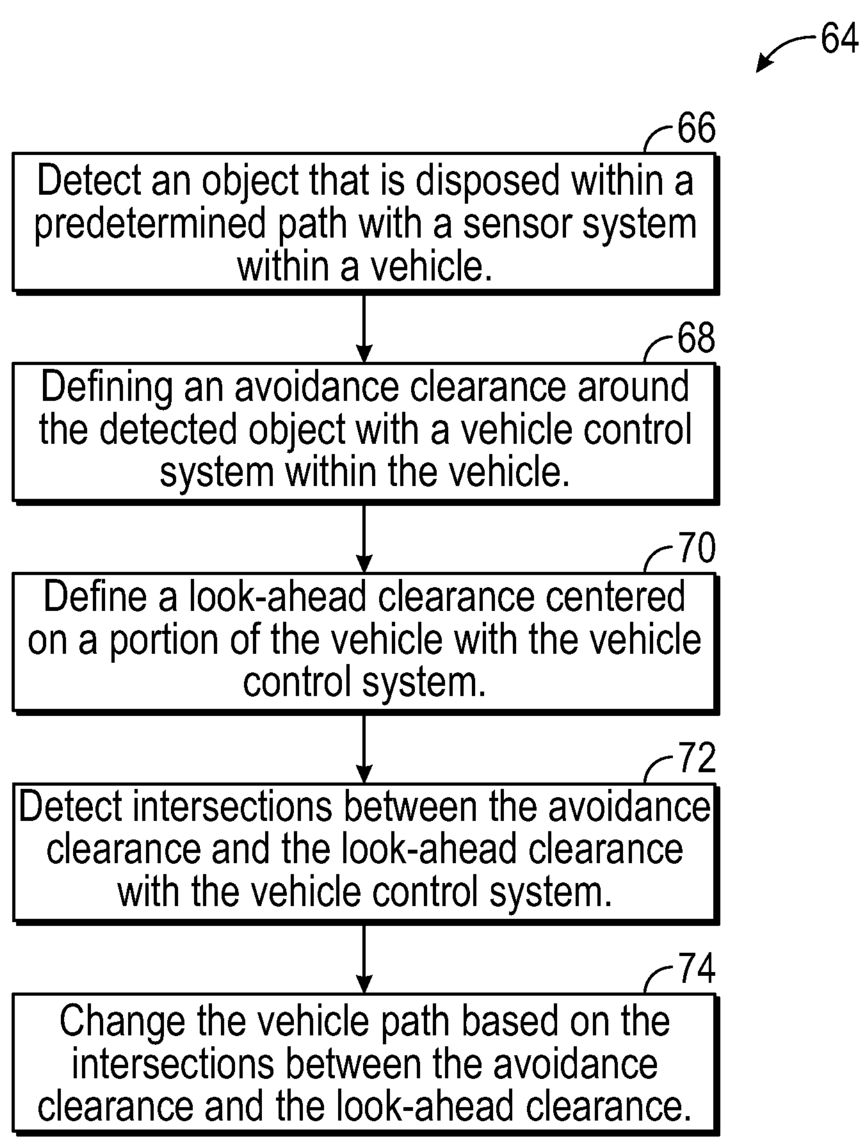
FIG. 6 is a flow diagram illustrating method steps for the example autonomous control system.

Referring to FIG. 6 with continued reference to FIGS. 3-5, a flow chart 64 illustrates the steps performed by the control system 20 to provide a route around the obstacle 50. In this example, an initial step includes detecting an object that is disposed within a previously determined reference path 48 as indicated at 66. In this example, the obstacle 50 is directly within the reference path 48 and therefore the vehicle 22 an alternate path around the obstacle 50 is warranted. Detection of the obstacle 50 occurs with one or all of several sensor systems 38, 40, 42 mounted within the vehicle 22.

The control system 20 defines an avoidance circle 52 around the detected obstacle 50 as is indicated at 68. The avoidance circle 52 is centered on the obstacle 50 and is of a diameter 64 sufficient to enable the vehicle to pass the obstacle 50 without contacting it.

The vehicle control system 20 simultaneously defines a look-ahead clearance circle 54 centered on the steerable axle 28 of the vehicle 22 as is indicated at 70. The look-ahead clearance circle 54 is generated with a diameter 66 that assures sufficient clearance for the vehicle 22 around the obstacle 50.

Intersection points 56, 58 between the avoidance circle 52 and the look-ahead clearance circle 54 are determined as indicated at 72. The control system 20 uses the intersections 56, 58 as potential target points to steer the vehicle around the obstacle 50. One of the intersection points 56, 58 is selected by determining a distance from other obstacles around the vehicle 22, such as the example boundary 46. It should be appreciated, that although the boundary is described by way of example, other objects such as other vehicles, buildings and/or any other feature that constrain movement of the vehicle 22 are within the contemplation and scope of this disclosure.

The intersection point that is furthest from any other boundary indicates a preferred direction for the vehicle to proceed. In this disclosed example, the intersection 58 is at a greater distance from the boundary 46. Accordingly, the control system 20 directs the vehicle 22 towards the intersection indicated at 58 as is indicated at 74.

As the vehicle moves past the obstacle, the look-ahead clearance circle 54 and the avoidance clearance circle provide a predetermined minimum clearance between the vehicle 22 and the obstacle 50. Once the vehicle 22 is past the obstacle 50, it will proceed back towards the previously defined reference path 48. Accordingly, the disclosed control system 20 provides for maneuvering of a vehicle 22 around an obstacle 50.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A method of autonomously defining a vehicle path comprising:

detecting an object that is disposed within a predetermined path with a sensor system within a vehicle;

defining an avoidance clearance around the detected object with a vehicle control system within the vehicle, wherein the avoidance clearance around the detected object comprises a circular area centered on the object;

defining a look-ahead clearance centered on a portion of the vehicle with the vehicle control system, wherein the look-ahead clearance comprises a circular area, and the vehicle portion comprises a midpoint of an axle of the vehicle controlling a heading of the vehicle;

detecting two intersections between the avoidance clearance and the look-ahead clearance with the vehicle control system; and changing the vehicle path based on the two intersections between the avoidance clearance and the look-ahead clearance.

2. The method as recited in claim 1, wherein the circular area of the avoidance clearance comprises a radius equal to at least half a width of the vehicle.

3. The method as recited in claim 1, wherein the circular area of the look-ahead clearance comprises a radius equal to or greater than at least half a width of the vehicle.

4. The method as recited in claim 1, wherein changing the vehicle path further comprises realigning the predetermined path with the two intersections between the avoidance clearance and the look-ahead clearance.

5. The method as recited in claim 4, further comprising selecting one of the two intersections for realigning the predetermined path.

6. The method as recited in claim 5, wherein selecting one of the two intersections comprises comparing a distance between each of the two intersections and a constraint that limits movement of the vehicle and selecting the one of the two intersections that is the greater distance from the constraint.

7. The method as recited in claim 6, wherein the constraint comprises a predefined boundary that separates different driving surfaces.

8. The method as recited in claim 6, wherein the constraint comprises a predefined boundary, the predefined boundary comprising an object extending upwardly from a driving surface.

9. The method as recited in claim 1, further including realigning the vehicle path with the predetermined path responsive to the look-ahead clearance passes a detected intersection.

10. An autonomous vehicle control system comprising:

a controller mountable within a vehicle that is configured to:

detect an object that is disposed within a predetermined path with a sensor system within a vehicle;

define an avoidance clearance around the detected object with a vehicle control system within the vehicle, wherein the avoidance clearance around the detected object comprises a circular area centered on the object;

define a look-ahead clearance centered on a portion of the vehicle with the vehicle control system, wherein the look-ahead clearance comprises a circular area, and the vehicle portion comprises a midpoint of an axle of the vehicle controlling a heading of the vehicle;

detect two intersections between the avoidance clearance and the look-ahead clearance with the vehicle control system; and change a vehicle path based on the detected two intersections between the avoidance clearance and the look-ahead clearance.

11. The autonomous vehicle control system as recited in claim 10, wherein the circular area of the avoidance clearance has a radius equal to at least half a width of the vehicle.

12. The autonomous vehicle control system as recited in claim 11, wherein the controller is further configured to realign the predetermined path based on a location of the two intersections between the avoidance clearance and the look-ahead clearance.

13. The autonomous vehicle control system as recited in claim 12, wherein the controller is further configured to select one of the two intersections for realigning the predetermined path.

14. The autonomous vehicle control system as recited in claim 13, wherein the controller is configured to compare a distance between each of the two intersections and a constraint that limits movement of the vehicle and to select the one of the two intersections that is the greater distance from the constraint.

15. A non-transitory computer readable storage medium including instructions for operating an autonomous vehicle control system, the non-transitory computer readable storage medium including:

instructions to prompt a controller to detect an object that is disposed within a predetermined path with a sensor system within a vehicle;

instructions to prompt a controller to define an avoidance clearance around the detected object with a vehicle control system within the vehicle, wherein the avoidance clearance around the detected object comprises a circular area centered on the detected object;

instructions to prompt a controller to define a look-ahead clearance centered on a portion of the vehicle with the vehicle control system, wherein the look-ahead clearance comprises a circular area, and the vehicle portion comprises a midpoint of an axle of the vehicle controlling a heading of the vehicle;

instructions to prompt a controller to detect two intersections between the avoidance clearance and the look-ahead clearance with the vehicle control system; and instructions to prompt a controller to change a vehicle path based on the detected two intersections between the avoidance clearance and the look-ahead clearance.

16. The non-transitory computer readable storage medium as recited in claim 15 further comprising instructions for prompting the controller to compare a distance between each of the two intersections and a constraint that limits movement of the vehicle and to select the one of the two intersections with the greater distance from the constraint.

* * * * *